US007064797B2

(12) United States Patent
Kawata

(10) Patent No.: US 7,064,797 B2
(45) Date of Patent: Jun. 20, 2006

(54) PORTABLE ELECTRONIC APPARATUS HAVING CURVED THIN FILM-TYPE DISPLAY MEMBER

(75) Inventor: Masayuki Kawata, Chiba (JP)

(73) Assignee: Seiko Instruments Inc., Chiba (JP)

(*) Notice: Subject to any disclaimer, the term of this patent is extended or adjusted under 35 U.S.C. 154(b) by 0 days.

(21) Appl. No.: 10/387,076

(22) Filed: Mar. 12, 2003

(65) Prior Publication Data

US 2003/0179326 A1 Sep. 25, 2003

(30) Foreign Application Priority Data

Mar. 20, 2002 (JP) ............................ 2002-078040

(51) Int. Cl.
*G02F 1/1333* (2006.01)

(52) U.S. Cl. .......................................... 349/58; 349/84

(58) Field of Classification Search .................. 349/58; 368/282, 294, 30

See application file for complete search history.

(56) References Cited

U.S. PATENT DOCUMENTS

| | | | | |
|---|---|---|---|---|
| 4,020,627 | A * | 5/1977 | Yoshida et al. | 368/84 |
| 5,959,762 | A * | 9/1999 | Bandettini et al. | 359/265 |
| 6,738,111 | B1 * | 5/2004 | Kawata | 349/58 |
| 2002/0021624 | A1 * | 2/2002 | Hiranuma et al. | 368/282 |

FOREIGN PATENT DOCUMENTS

| | | |
|---|---|---|
| JP | 06 160820 | 6/1994 |
| JP | 06 167581 | 6/1994 |
| JP | 08305295 | * 11/1996 |
| JP | 00 019491 | 1/2000 |
| JP | 00 293117 | 10/2000 |
| JP | 2000293117 | * 10/2000 |
| JP | 01 134212 | 5/2001 |
| JP | 01 167651 | 6/2001 |

* cited by examiner

*Primary Examiner*—Andrew Schechter
*Assistant Examiner*—Richard H Kim
(74) *Attorney, Agent, or Firm*—Adams & Wilks

(57) ABSTRACT

A portable electronic apparatus has a thin film-type display member and a holding mechanism for holding the film-type display member 50 in a curved state. The holding mechanism has a first holding member having a recessed portion receiving the thin film-type display member and a second holding member engaged with the first holding member to hold the thin film-type display member in the recessed portion of the first holding member in a curved state. A case has a recessed portion and a locking member for locking the holding mechanism in the recessed portion of the case to hold the thin film-type display member in the curved state.

20 Claims, 4 Drawing Sheets

PORTABLE ELECTRONIC APPARATUS HAVING CURVED THIN FILM-TYPE DISPLAY MEMBER

BACKGROUND OF THE INVENTION

1. Field of the Invention

The present invention relates to a portable-type electronic apparatus and, more specifically, to a portable-type electronic apparatus having a nonlinear mode adapted to a position and a shape of a mounted portion of the human body to be suitable for carrying.

2. Description of the Prior Art

In a conventional portable-type electronic apparatus mounted to the armor the wrist portion such as a watch, a flexible film-like liquid crystal display apparatus is used as a liquid crystal display portion and the film-like liquid crystal display apparatus is curved to adapt to a curvature around the wrist. In order to mount the film-like liquid crystal display apparatus in a curved state, a curved face is formed at a surface of a support member of an electronic apparatus main body and a peripheral portion of the film-like liquid crystal display apparatus is pressed to the curved face of the support member while being curved by a hold member. Such conventional apparatus has been proposed in JP-A-6-160820.

However, since the film-like liquid crystal display apparatus is integrally provided with, for example, a polarizer, a rigidity thereof is comparatively high and therefore, it is difficult to curve the film-like liquid crystal display apparatus necessarily to a desired shape. Particularly, when an edge portion of the film-like liquid crystal apparatus not provided with an edge portion disposed on a plane in a curved mounting state of the film-like liquid crystal display apparatus, it is not easy to accurately mount the film-like liquid crystal apparatus in the curved state and positioning of the liquid crystal apparatus in the curved state and positioning of the liquid crystal display apparatus is liable to be inaccurate. When positioning or curving of the liquid crystal display apparatus is not accurately carried out, there is a concern that an active area of a display portion is warped or a positional shift of the display portion is brought about. Further, during pressing or deformation which differ by a portion of the liquid crystal display apparatus, there is also a concern that thicknesses of liquid crystals differ by locations, an interference fringe is produced and a display which differs in color or concentration by locations is produced.

SUMMARY OF THE INVENTION

The invention has been carried out in view of the various points and it is an object thereof to provide a portable type electronic apparatus capable of attaching a thin film type display member such as a film-like liquid crystal display apparatus accurately in a curved state.

In order to achieve the above-described object, a portable electronic apparatus of the invention comprises a thin film type display member, a display member holding mechanism comprising a lower side holding member having a receiving recessed portion for receiving the thin film type display member in a curved state and an upper side holding member engaged with the lower side holding member at a peripheral edge portion of the receiving recessed portion to hold the thin film display member arranged at the receiving recessed portion of the lower side holding member in cooperation with the lower side holding member, and a case having locking means for locking the display member holding mechanism in the containing recessed portion.

The portable electronic apparatus of the invention is provided with "the display member holding mechanism comprising the lower side holding member having the receiving recessed portion for receiving the thin film type display member in the curved state and the upper side holding member engaged with the lower side holding member at the peripheral edge portion of the receiving recessed portion to hold the thin film display member arranged at the receiving recessed portion of the lower side holding member in cooperation with the lower side holding member" and therefore, the thin film type display member can previously be held by the display member holding mechanism. Here, in holding the thin film type display member by the holding mechanism, the thin film type display member can be integrated to the holding mechanism in a state of exposing the display member holding mechanism and therefore, the thin film type display member can be deformed while grabbing the thin film type display member and the lower side and the upper side holding members of the display member holding mechanism and therefore, regardless of the way of deforming the thin film type display member, the deformation can accurately be carried out. Further, according to the portable electronic apparatus of the invention, the case is "provided with the locking means for locking the display member holding mechanism in the containing recessed portion" and therefore, by only locking the display member holding mechanism by the locking means, the thin film type display member can accurately be integrated in the case of the electronic apparatus. Therefore, according to the portable electronic apparatus of the invention, by only integrating the thin film type display member to the display member holding mechanism comprising the upper side and the lower side holding members and successively locking the display member holding mechanism integrated with the thin film type display member simply by the locking means, the thin film type display member held in an accurate shape by the display member holding mechanism can accurately be positioned to the containing recessed portion of the case.

Here, the "thin film type display member" refers to a display member of a kind in which a thickness thereof is thin in comparison with an area thereof and a display member deformable to be curved and any of the kind can be used. That is, the thin film type display member is typically, for example, constituted by a liquid crystal display apparatus in a film-like shape. Although the film-like liquid crystal display apparatus is constituted by, for example, an STN liquid crystal display apparatus or the like, in place thereof, the film-like liquid crystal display apparatus may be a liquid crystal display apparatus of other kind such as a TFT liquid crystal display apparatus. The film-like liquid crystal display apparatus may be a reflection type liquid crystal display apparatus or may be a liquid crystal display apparatus having a backlight. In the latter case, as a backlight, a light source of a thin film type of an organic EL apparatus or the like may be laminated. Further, the thin film type display member may be other thin film type display member of a thin film type EL apparatus such as an organic EL apparatus or the like instead of the liquid crystal display apparatus. The thin film type display member may be a member including a polarizer or the like and having a comparatively high bending rigidity.

Although the thin film type display member can more or less be curved due to the thinness, the thin film type display member is provided with considerable rigidity due to various causes and therefore, when the thin film type display member is integrated by curving the thin film type display member, there is a concern that it is difficult to accurately position the thin film type display member, however, according to the portable electric apparatus of the invention, the thin film type display member is previously integrated to the display member holding mechanism by curving the thin film type display member and therefore, accurate curving and positioning can firmly be carried out.

For example, when an elongated thin film of polymer such as PVA (polyvinyl alcohol) is used as a polarizer for a thin film type display member in a film-like liquid crystal display apparatus, the polarizer comprising the strongly elongated film is held to be interposed between protective layers having higher rigidity and therefore, rigidity of the polarizer portion comprising the polarizer and the protective films is liable to comparatively increase. As a result, when there is not the display member holding mechanism for holding the thin film type display member previously in the curved state, there is a concern that it is difficult accurately curve and position the thin film type display member, however, according to the portable electronic apparatus of the invention, the thin film type display member is integrated to the display member holding mechanism previously by curving the thin film type display member and therefore, accurate bending and positioning can firmly be carried out. Further, in the case of the film-like liquid crystal display apparatus, in forcible curving operation, when a portion of the film is pressed more strongly than other portion, a dispersion in the thickness of the liquid crystal layer is difficult to disregard and there is a concern that a nonuniformity is brought about in the display, however, according to the portable electronic apparatus of the invention, the thin film type display member is previously integrated to the display member holding mechanism by curving the thin film type display member and therefore, accurate curving and positioning can firmly be carried out and therefore, there is hardly a concern of bringing about nonuniformity of display. Further, when a ceramic species polarizer is used as the polarizer instead of the polymer thin film, due to the rigidity of the ceramic plate, it is similarly difficult to produce accurate curving. Therefore, in the case of the thin film type display member of a type of utilizing a polarizer, it is difficult to avoid a similar problem by other than the film-like liquid crystal display apparatus, however, according to the portable electronic apparatus of the invention, the thin film type display member is previously integrated to the display member holding mechanism by curving the thin film type display member and therefore, accurate bending and positioning can firmly be carried out and beautiful display can firmly be carried out.

Although a structure of the display member holding mechanism may be constituted by any structure so far as the thin film type display member can be positioned in a direction along an extended face thereof by bringing the side edge of the thin film type display member into contact with the side wall of the receiving recessed portion of the lower side holding member and the thin film type display member can be positioned at the lower side in the thickness direction by supporting at least a portion of the lower face of the thin film type display member by the bottom face of the receiving recessed portion, further, so far as the thin film of the display member can be positioned at the upper side in the thickness direction by supporting at least a portion of the upper face of the thin film type display member by the upper side holding member, the lower side and the upper side holding members are typically provided with a plurality of engaging recessed portions or engaging projected portions engaged with each other to position and a plurality of engaging projected portions or engaging recessed portions complimentary therewith. Further, preferably, the lower side holding member is provided with a plurality of pieces of hook portions in an eaves-like shape for tackedly fixing the thin film type display member in the receiving recessed portion to facilitate to accurately position and fix the thin film type display member.

Further, in the specification, “lower side” indicates a bottom portion of the case and “upper side” indicates a side of a display face of the display member. However, depending on a mode of using the portable electronic apparatus, “upper side” may be disposed on an upper side of “lower side”.

According to the portable electronic apparatus of the invention, the thin film type display member can be positioned and held at the peripheral portion by the holding mechanism and therefore, regardless of a curved shape of the thin film type display member and a shape of an edge portion thereof, the thin film type display member can accurately be curved and positioned. Therefore, it is possible to adopt a curved shape and an edge portion shape giving a preference of design to easiness of curving or easiness in holding in the curved state or giving a preference to a reduction in an occupied space, for example, the peripheral edge portion of the thin film type display member can be disposed along a curved face in a state in which the thin film type display member is received in the receiving recessed portion of the lower side holding member and held in the display member holding mechanism such that a space on a lower side of the lower side holding member can maximally be used as a space for containing other parts of control circuits of the electronic apparatus and the like or the case of the electronic apparatus constitutes a minimum occupied space in a range of satisfying a shape to be adopted in accordance with needs including a design feature.

Although according to the portable electronic apparatus of the invention, the locking means will be constituted by any structure so far as the thin film type display member can be locked to be held in the containing recessed portion of the case thereby, the locking means typically comprises a locking means main body portion in a flat plate shape mounted on a bottom wall of the containing recessed portion and a plurality of engaging projected edge portions folded to bend relative to the main body portion to project to an opening portion of the containing recessed portion at a plurality of locations of the peripheral edge portion of the locking means main body portion. In this case, it is facilitated to lock the display member holding mechanism by the locking means from the side of the opening portion of the containing recessed portion. Further, in this case it is easy to ensure a space between the upper face of the main body portion of the locking means and the lower face of the display member holding mechanism and therefore, it is possible to summarize various circuits for controlling operation of the electronic apparatus and controlling display by the display member to arrange in the space typically in a mode of a circuit block. However, there may be other structure for permitting to lock the thin film type display member from the side of the opening portion.

According to the portable electronic apparatus of the invention, the locking means comprises a metal and the portable electronic apparatus is provided with a shielding terminal portion extended from the locking body main body portion to the circuit block and elastically brought into contact with the circuit block. Since chassis grounding of the circuit block can be carried out relative to the locking means and therefore, operation of the circuit block is liable to be stabilized and difficult to undergo influence of noise.

BRIEF DESCRIPTION OF THE DRAWINGS

A preferred form of the present invention is illustrated in the accompanying drawings in which:

FIGS. 6 show outlines of the electronic apparatus of FIG. 1, where

DETAILED DESCRIPTION OF THE PREFERRED EMBODIMENTS

Next, a preferable mode for carrying out the invention will be explained based on a preferable embodiment shown in attached drawings.

Embodiment

FIGS. 1–6D show a portable information apparatus 1 as a portable-type electronic apparatus according to a preferable embodiment of the invention. The portable information apparatus 1 a wearable electronic apparatus of a type mounted to the wrist W such as a wrist watch and is provided with a time display function as a wrist mounting type watch, that is, a wrist watch and other information processing function as desired. In the following, for simplifying explanation, the portable information apparatus 1 is regarded as a watch having a time counting function or the like and the portable information apparatus 1 is referred to also as a timepiece. However, the portable information apparatus 1 can be provided with other information processing function as desired.

Figure 1:
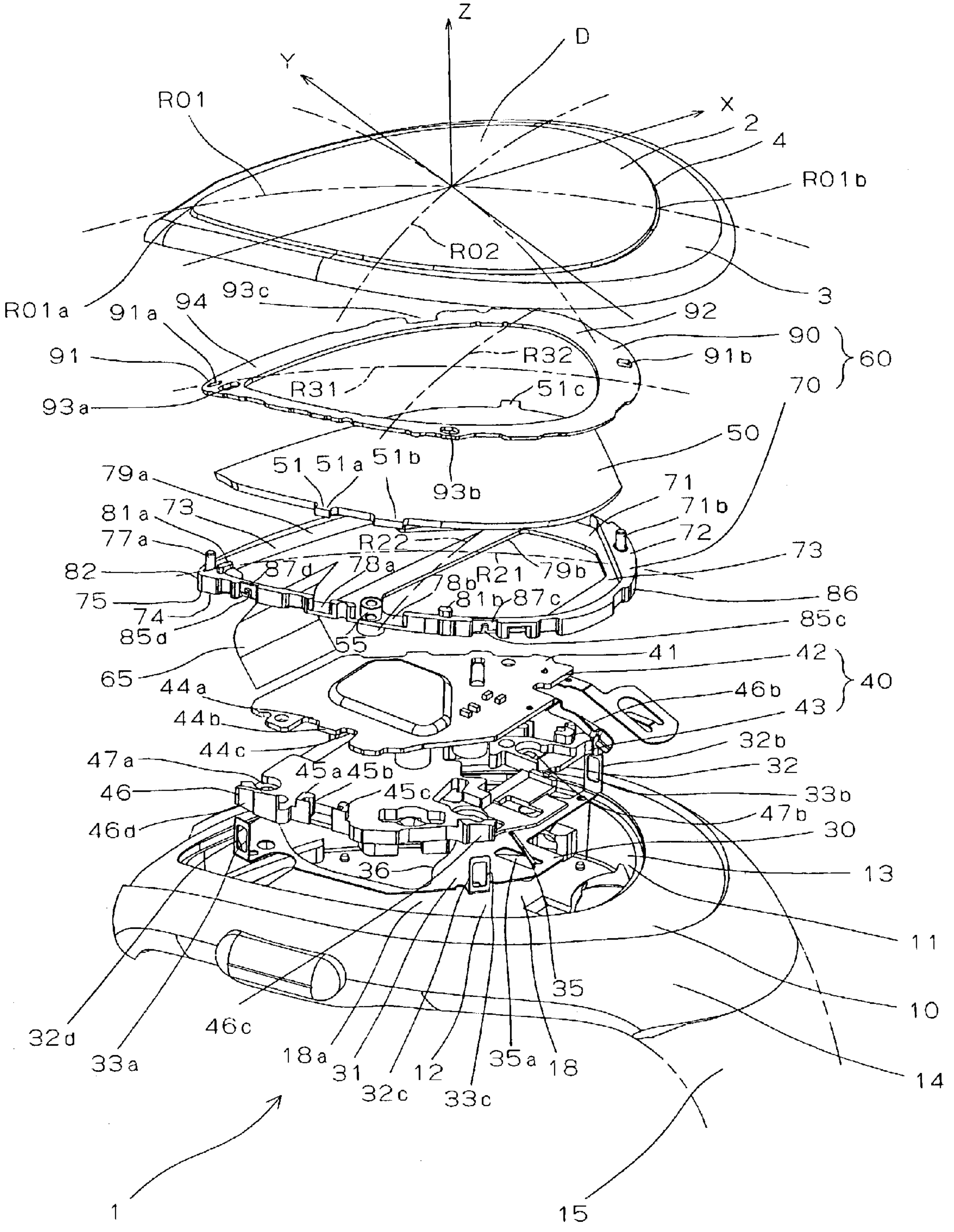
FIG. 1 is a disassembled perspective explanatory view of a portable electronic apparatus according to a preferable embodiment of the invention.

As is shown by a developing view (disassembled view) of FIG. 1, the portable information apparatus 1 includes a case 10, a module fixing plate 30 as connecting or locking means, a circuit block structure 40, thin film-type display member such as a film-like liquid crystal apparatus 50, and a support or holding mechanism 60 thereof. Further, the case 10 is covered with a lid 3 having a glass plate 2.

As shown by FIG. 1 and FIGS. 6, the portable information apparatus 1 is provided with a display region D substantially in an elliptical shape extended skewedly to a direction W1 of extending the wrist W of the left hand. The display region D is further curved skewedly. Although the curved shape may be provided only to the film-like liquid crystal apparatus 50, the holding mechanism 60 and a bottom portion of the case 10, according to the portable information apparatus 1, the glass plate 2 of the lid 3 of the case 10 is provided with a similarly curved shape in addition to the film-like liquid crystal apparatus 50, the holding mechanism 60 and the bottom portion of the case 10 supporting the hold mechanism 60 of the film-like liquid crystal apparatus 50.

Therefore, although in the following, the curved shape is explained in details by taking an example of the glass plate 2, the explanation of the curved shape of the glass plate 2 is applicable to, for example, the film-like liquid crystal apparatus 50 as it is. Further, in the following, to make the explanation simple and clear, there is adopted a three-dimensional orthogonal coordinates system constituting an origin by a center of a surface of the glass plate 2. Here, it is assumed that X axis is a direction directed to the fingers along the direction L1 of extending the wrist W, Y axis is directed in a front direction when the wrist W of the left hand is arranged in parallel with a front face of the body and horizontally, and Z axis coincides an upward direction of a vertical direction when X-Y plane is made horizontal. However, X-Y plane is assumed to be a plane in contact with the glass plate 2 at the origin of the coordinates system.

In the illustrated example, as is known from FIG. 1 and FIGS. 6, the glass plate 2 of the portable information apparatus 1 is provided with a long diameter R01 extended in a direction of connecting the second quadrant and fourth quadrant skewedly to both of X axis and Y axis and is provided with a short diameter R02 in a direction orthogonal to the direction of extending the long diameter R01. More in details, an outer edge portion or a peripheral edge portion 4 is provided with a contour shape pointed such that a radius of curvature of a portion at a vicinity of a long diameter end portion R01*a* disposed at the second quadrant is larger than a radius of curvature at a portion at a vicinity of a long diameter end portion R01*b* disposed at the fourth quadrant and similar to a warped spoon as a whole. Therefore, when the wrist portion W is arranged skewedly to the front face of the body and horizontally as shown by FIG. 6A, the glass plate 2 is provided with substantially an elliptical shape slender in the skewed direction to take a position such that the long axis R01 is extended in a left and right direction substantially in parallel with the front face of the body and the short axis R02 is extended in a front and rear direction substantially orthogonal to the front face of the body.

Figure 6A:
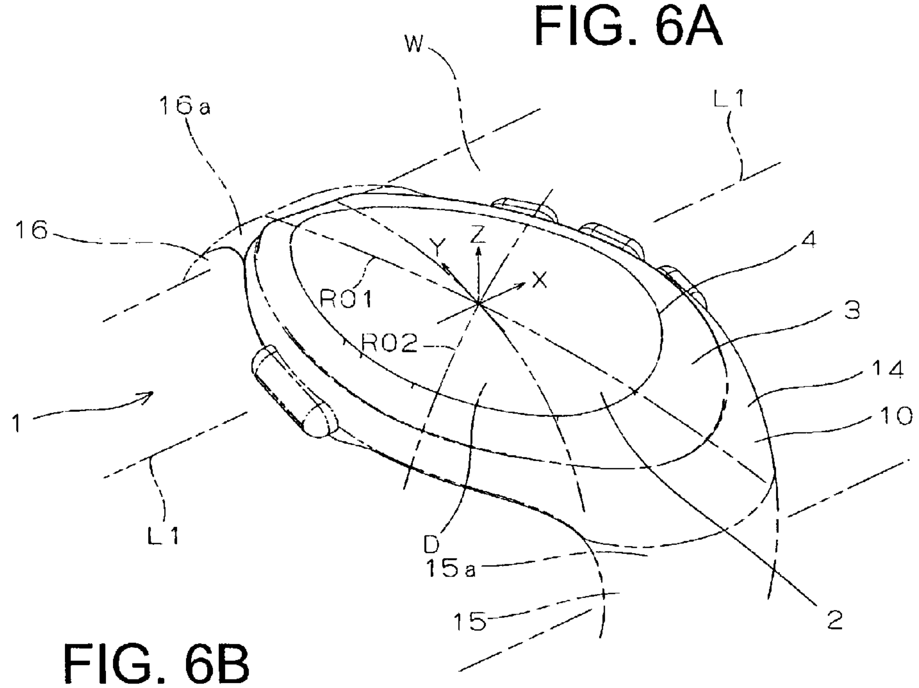
FIG. 6A is a perspective explanatory view.
Figure 6B:
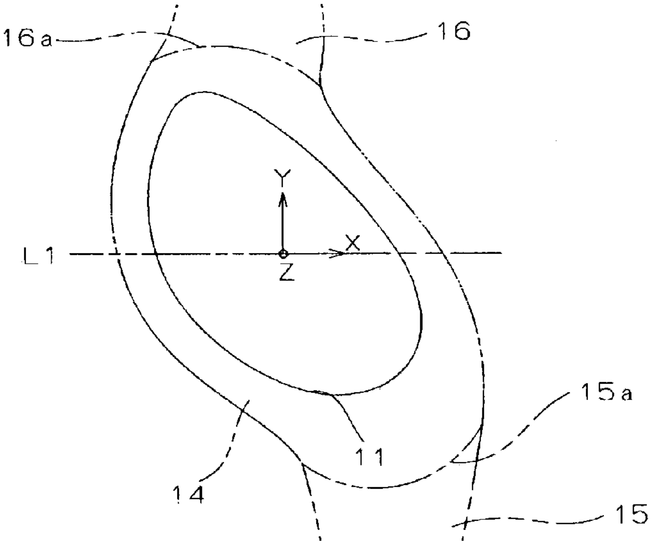
FIG. 6B is an upper explanatory view of an outline of a liquid crystal display apparatus.
Figure 6C:
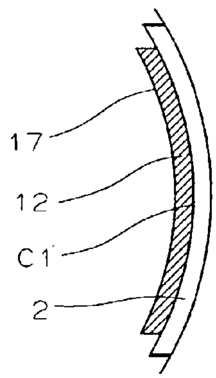
FIG. 6C is a side explanatory view showing a curved state of the liquid crystal display apparatus in a state of integrating the apparatus.

As shown by FIG. 6C, the glass plate 2 constitutes a curved face having, for example, a radius of curvature of C1 when viewed by a section orthogonal to X axis. The radius of curvature of C1 is constant without depending upon, for example, a position on X axis. That is, in this example, the glass plate 2 is formed by a shape by cutting out a portion of a circular cylinder having a radius of C1 in which a generator is extended in a direction in parallel with X axis skewedly in an elliptical shape. Therefore, the edge portion 4 of the glass plate 2 is provided with a curved complicated shape in a three-dimensional space.

Further, the shape of the glass plate 2 exemplified here is only an example and so far as there is an advantage of being easy to see for a user or a preferable design, for example, the radius of curvature of the glass plate 2 viewed from a face orthogonal to X axis may not be constant, for example, the more proximate to both ends in Y direction from the center, the larger the radius of curvature may become gradually or conversely the smaller the radius of curvature may gradually become, further, the shape may be other shape such that the radius of curvature is gradually increased or conversely reduced in +Y direction (in front direction). Further, depending on cases, the radius of curvature of C1 may be varied depending on the position on X axis. Also in this case, for example, the more proximate to both ends in X direction from the center, the larger the radius of curvature may become gradually or the smaller the radius of curvature may become, further, the radius of curvature may gradually be increased or gradually reduced in +X direction (fingers side). Further, here, the glass plate 2 indicates a transparent plate and the material may be glass or ceramic or resin which is not referred to as glass generally.

Similarly, also the shape in an extended face of the glass plate 2 may be any other shape such as an elliptical shape or an egg shape in place of the spoon-like elliptical shape.

At any rate, when the shape of the film-like liquid crystal apparatus 50 is a shape other than a rectangular shape (rectangular shape or square shape) and the extended face of the film-like liquid crystal apparatus 50 is curved in a nonplanarly shape or when a direction of curving the film-like liquid crystal apparatus 50 (a direction of a section minimizing a radius of curvature) is intersected with a direction of extending a side of a square shape regardless of whether the shape of the film-like liquid crystal apparatus 50 is rectangular, an edge portion of a warped elliptical shape of the film-like liquid crystal apparatus 50 is not mounted on a horizontal face and the film-like liquid crystal apparatus 50 can have a complicated three-dimensional shape.

Figure 2:
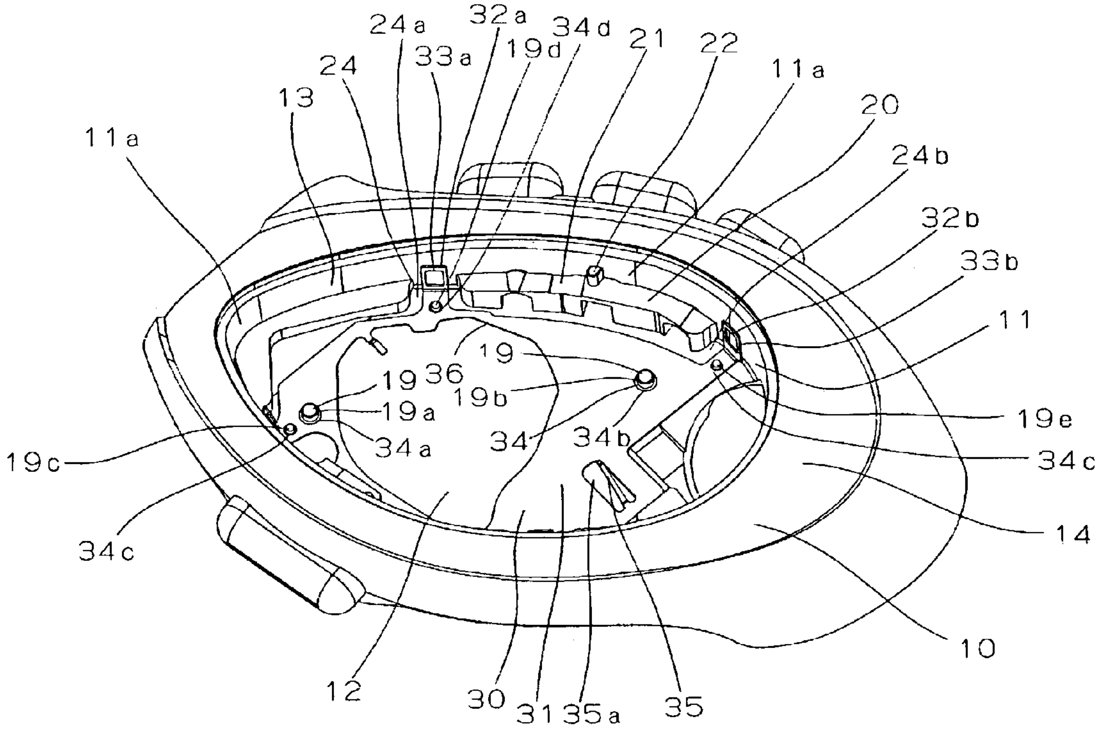
FIG. 2 is a perspective explanatory view of a state of attaching a module fixing plate to a containing recessed portion of a case in the electronic apparatus of FIG. 1.

As shown by FIG. 1 and FIG. 2, the case 10 includes a case main body portion 14 having a base portion or bottom wall 12 and a peripheral wall 13 specifying a containing recessed portion 11 and strap portions 15 and 16 extended from the case main body portion 14 (refer to FIG. 6B). The containing recessed portion 11 is also provided with a generally elliptical shape, more in details, a shape in which one end 11*a* of an ellipse is slightly pointed. A bottom plate 17 of the bottom wall 12 of the containing recessed portion 11 is provided with a curved shape similar to that of the glass plate 2 as shown by FIG. 6C. Further, the strap portions 15 and 16 are respectively provided with base end portions 15*a* and 16*a* at positions shifted in X direction and extended to be slightly inclined to −X and +X direction, respectively, to be engaged with front end portions of others of the strap portions 16 and 15 on the reverse side of the wrist W.

Figure 6D:
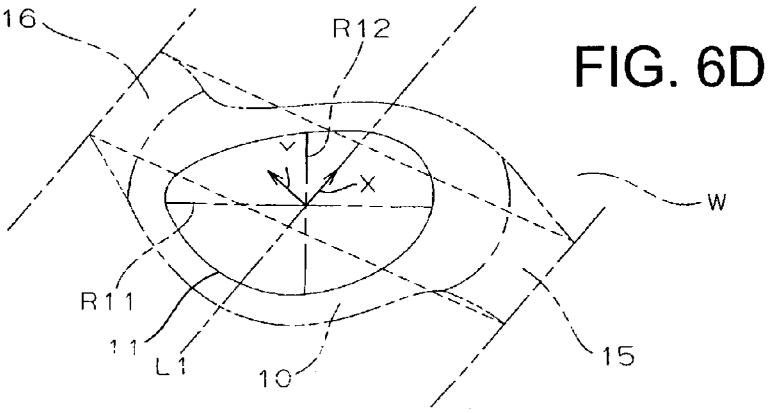
FIG. 6D is an upper explanatory view for explaining an inclined arrangement of the apparatus.

Therefore, for example, in a state of being mounted on the wrist W of the left hand, has shown by FIG. 6D, in a state in which the wrist is skewed, the case 10 takes a position at which the long axis R11 of the ellipse of the recessed portion 11 is extended in a left and right direction and the short axis R12 is extended from this side to the depth side. Here, directions of the long axis R11 and the short axis R12 of the recessed portion 11 substantially coincide with directions of the long axis R01 and the short axis R02 of the glass plate 2. That is, display of the portable information apparatus 1 is carried out in a direction by which the upper side and the lower side coincide with those in a state shown by FIG. 6D.

An inner surface 18 of the bottom wall 12 of the containing recessed portion 11 of the case main body portion 14 is provided with a plane portion 18*a* (FIG. 1) which is flat in, for example, most of a region including a central portion thereof and formed with a plurality of engaging projected portions 19*a*, 19*b*, 19*c*, 19*d*, 19*e* and 19*f* (FIG. 2), . . . (however, 19*f* is not illustrated, designated by notation 19 when generally designated or when the engaging projected portions are not differentiated from each other). Further, receiving base 20 is formed at a corner portion at which the peripheral wall 13 and the bottom wall 12 of the containing recessed portion 11 are intersected with each other. The receiving base 20 includes an engaging portion 22 formed at an upper face to support the hold mechanism 60 by being engaged with an irregularity portion 75 of a bottom face of the hold mechanism 60 of the film-like liquid crystal apparatus 50 and engaging recessed portions 24*a*, 24*b*, 24*c*, 24*d*, . . . to be fitted with engaging projected portions of the module fixing plate 30 (however, 24*c*, 24*d* are not illustrated, designated by notation 24 when generally designated or when the engaging recessed portions are not differentiated from each other).

The module fixing plate 30 constituting locking means comprises a member constituted by folding to bend a metal thin plate and is constituted by a bottom portion in a planar or flat plate shape constituting a fixing plate main body portion 31 and locking edge portions 32*a*, 32*b*, 32*c*, 32*d*, . . . projected upwardly by being folded to bend relative to the main body portion 31 (designated by notation 32 when generally designated or when the locking edge portions are not differentiated from each other). The locking edge portions 32*a*, 32*b*, 32*c*, 32*d* . . . include engaging hole portion 33*a*, 33*b*, 33*c*, 33*d*, . . . to be engaged with locked projections, mentioned later, (designated by notation 33 when generally designated or when the engaging holes are not differentiated from each other). Sizes and heights of the respective blocking edge portions 32 may be the same as each other or different from each other as desired, further, sizes or shapes or height positions of the respective engaging hole portions 33 of the respective locking edge portion 32 may be the same as each other or different from each other as desired. Further, the main body portion 31 of the module fixing plate 30 is further formed with through hole portions 34*a*, 34*b*, 34*c*, 34*d*, 34*e*, 34*f*, . . . (however, 34*f* is not illustrated, designated by notation 34 when generally designated or when the through hole portions are not differentiated from each other) for receiving the engaging projected portions 19*a*, 19*b*, 19*c*, 19*d*, 19*e*, 19*f*, . . . (however, 19*f* is not illustrated) disposed at the bottom wall 12 of the recessed portion 11 of the case 10.

The module fixing plate 30 is mounted on the recessed portion 11 such that the locking edge portions 32*a*, 32*b*, . . . are engaged with corresponding ones of the engaging recessed portions 24*a*, 24*b*, . . . of the case 10 and corresponding ones of the projections 19*a*, 19*b*, . . . of the bottom wall 12 of the case 10 are fitted to the holes 34*a*, 34*b*, . . . of the main body portion 31. Although the module fixing plate 30 is provided with the main body portion 31 in a shape of a thin plate and the engaging edge portions 32 along an inner surface of the recessed portion 11 to be able to ensure a containing space as wide as possible in the containing recessed portion 11 having the bottom wall 12 having a curved rear face 17, a shape and a structure thereof may differ so far as the film-like liquid crystal apparatus 50 and the circuit block structure 40 for various processings of the electronic apparatus 1 including driving and controlling processings can stably be supported.

When the module fixing plate 30 is mounted at a predetermined position relative to the case 10, for example, the projected portions 19*c*, 19*d*, 19*e*, 19*f*, (however, 19*f* is not illustrated) of the bottom wall 12 penetrating the holes 34*c*, 34*d*, 34*e*, 34*f* (however, 34*f* is not illustrated) of the main body portion 31 in a thin plate shape are calked by thermal calking to thereby fix the module fixing plate 30 to the case 10. A state of arranging and fixing the module fixing plate 30 at the containing recessed portion 11 of the case 10 in this way is a state shown in FIG. 2.

Although a bottom face portion of the recessed portion 11 to be mounted with the main body portion 31 of the module fixing plate 30 is typically a plane, depending on cases, the bottom face portion may be irregular. Further, so far as the main body portion 31 can stably be mounted, when desired, a bottom face portion 18*a* of the recessed portion 11 may be curved similar to the rear face 17 and the main body portion 31 may be curved. Further, when desired, the bottom face portion 18*a* may be curved, the bottom face portion 18*a* may be formed with a number of projected portions and heights of the projected portions may be adjusted such that front ends of the projected portions specify a plane and the main body portion 31 in the flat plate shape may stably be mounted on the projected portions.

The module fixing plate 30 further includes a sealing terminal 35 projected from the surface of the main body portion 31 in the planar shape and extended skewedly upwardly. Notation 35*a* designates a punched hole after forming the terminal 35. The main body portion 31 of the module fixing plate 30 is formed with an opening portion 36 as desired. In the case of the illustrated example, the module fixing plate 30 is constituted by punching sheet metal.

The circuit block structure 40 includes a circuit board or a printed circuit board 41 in a flat plate shape and a circuit block 42 comprising a number of circuit elements (not illustrated) mounted on the board 41 and a circuit holding frame 43 in a flat plate shape for holding the circuit block 42. A peripheral edge portion of the circuit board 41 of the circuit block 42 is provided with a plurality of irregular portions 44*a*, 44*b*, 44*c*, . . . (designated by notation 44 when generally designated or when the irregular portions are not differentiated from each other), and fixed to the circuit holding frame 43 by engaging the irregular portions 44*a*, 44*b*, 44*c*, . . . with corresponding projected portions or recessed portions 45*a*, 45*b*, 45*c*, . . . (designated by notation 45 when generally designated or when the projected portions or the recessed portions are not differentiated from each other) of the circuit holding frame 43 having complimentary shapes.

The circuit block structure 40 is guided by engaging hole portions 47*a* and 47*b* to be engaged with the projected portions 19*a* and 19*b* provided at the bottom wall 12 of the case 10 and arranged and fixed by thermal calking or the like. Further, groove portions 46*a*, 46*b*, 46*c*, 46*d*, . . . (designated by notation 46 when generally designated or when the groove portions are not differentiated from each other) planarly escaping the engaging edge portions 32*a*, 32*b*, 32*c*, 32*d*, . . . of the module fixing plate 30 are provided at corresponding side face portions of the circuit holding frame 43. The circuit holding frame 43 may be constituted by any shape and any structure so far as the circuit holding frame 43 can stably be mounted in the containing recessed portion 11 in a state of holding the circuit block 42 and according to the example, the side edge portion is provided with a shape substantially complimentary with an inner side edge of the receiving base 20 at the corner portion of the containing recessed portion 11 to dispose along the inner side edge.

Figure 3:
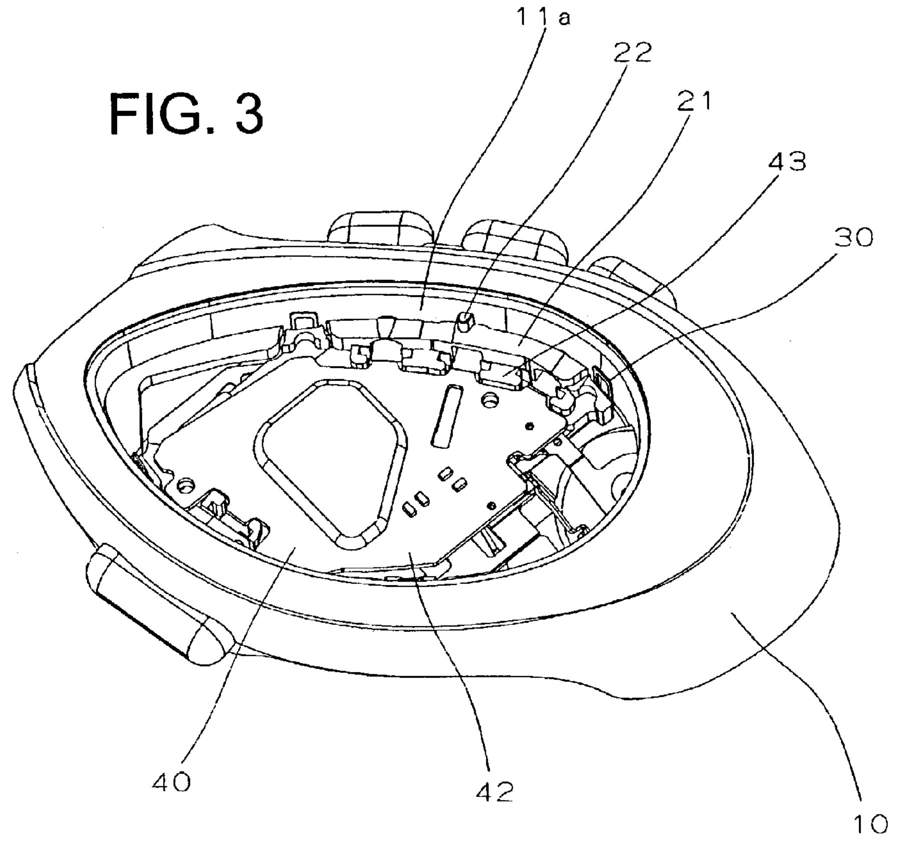
FIG. 3 is a perspective explanatory view of a state of attaching the module fixing plate and a circuit block structure to the containing recessed portion of the case in the electronic apparatus of FIG. 1.

A state in which the circuit block 42 supported by the circuit holding frame 43 is arranged at the containing recessed portion 11 and positions relative to the module fixing plate 30 via the circuit holding frame 43 is a state shown by FIG. 3.

The circuit board 41 of the circuit block 42 may be a flexible board instead of a rigid board and in that case the circuit holding frame 43 is provided with a shape and a structure suitable for stably supporting the flexible board in the containing recessed portion 11 while holding the flexible board. Naturally, the circuit holding frame 43 for supporting the board 41 may not be provided so far as the circuit block 42 having the rigid or flexible board 41 can stably be supported in the containing recessed portion 11.

The film-like liquid crystal apparatus holding mechanism 60 comprises a low side holding member 70 as a first mounting member having a receiving recessed portion 71 for containing the film-like liquid crystal apparatus 50 and an upper side holding member 90 as a second mounting member for positioning and holding the film-like liquid crystal apparatus 50 in the recessed portion 71 in cooperation with the lower side holding member 70.

The lower side holding member 70 comprises an integral molded product of, for example, thermoplastic resin, an outer shape thereof is substantially an elliptical shape and is provided with a curved face shape curved substantially similar to the lower face 17 of the bottom face 12 of the case 10. That is, the lower side holding member 70 is provided with a shape extended along a curved face C2 by a constant radius of curvature in view in a face orthogonal to a linear line L2 in parallel with an axis line L1 extended in a direction skewed relative to both of a long diameter R21 and a short diameter R22 of the ellipse. More in details, the lower side holding member 70 includes a thick-walled peripheral wall or edge portion 72 extended along a peripheral edge portion of the holding member 70 and a bottom wall portion 73 specifying the receiving recessed portion 71 at an upper face side thereof in cooperation with the edge portion 72.

The thick-walled edge portion 72 is provided with the irregularity portion 75 having a shape complementary with the engaging irregularity portion 21 of the receiving base 20 of the case 10 on a side of a lower face 74 thereof and accurately positioned relative to the case 10 by fitting the lower side holding member 70 into the upper peripheral wall 11*a* of the containing recessed portion 11 of the case 10 and mounting the lower face 74 onto the upper face 21 of the complimentary shape of the receiving base 20 and fitting the irregularity portion 75 of the lower face 74 to the engaging portion 22 of the complementary shape of the receiving case 20. That is, the outer peripheral face of the lower side holding member 70 can be positioned to the upper peripheral face 11*a* of the recessed portion 11 having the shape complimentary with the outer peripheral face, the lower face 74 of the peripheral edge portion can be positioned by the upper face 21 of the receiving base 20 having the shape complimentary with the lower face 74, further, the irregularity portion 75 of the lower face 74 can be positioned by the engaging portion 22 of the receiving base 20 having the shape complimentary with the irregularity portion 75. As a result, the lower side holding member 70 can be positioned accurately into the receiving recessed portion 11.

The lower side holding member 70 is further provided with pluralities of projections 77*a*, 77*b*, . . . (designated by notation 77 when generally designated or when the projections are not differentiated from each other) and recessed portions 78*a*, 78*b*, . . . (designated by notation 78 when generally designated or when the recessed portions are not differentiated from each other) at an upper face 76 of the edge portion 72 and is further provided with a plurality of small holes 80 in addition to a single or a plurality of large opening portions 79*a*, 79*b*, . . . (designated by notation 79 when generally designated or when the opening portions are not differentiated from each other) at the bottom wall 73.

The projections 77a, 77b, . . . of the upper face are fittedly inserted into, for example, hole portions 91a, 91b, . . . (designated by notation 91 when generally designated or when the hole portions are not differentiated from each other) of a complimentary shape of the upper side holding member 90. Meanwhile, the recessed portions 78a, 78b, . . . of the upper face receive, for example, peripheral edge projected portions 51a, 51b, . . . (designated by notation 51 when generally designated or when the peripheral edge projected portions are not differentiated from each other) of the film-like liquid crystal apparatus 50. The lower side holding member 70 further includes film-like liquid crystal locking edge portions or hook portions 81a, 81b, 81c (designated by notation 81 when generally designated or when the hook portions are not differentiated from each other) projected in an eaves-like shape upwardly of the recessed portion 71 and forms a tackedly fixing portion of the film-like liquid crystal apparatus 50 between the bottom face 73 and the eaves-like locking edge portions 81.

The locking edge portions 81 projected in the eaves-like shape are formed at, for example, a vicinity (81a) of a front end portion 82 having a comparatively pointed elliptical shape and desired positions (81b, 81c) constituting a triangle as a whole on both sizes of the front end portion 82 and positions the film-like liquid crystal apparatus 50 at substantially an accurate position in a curved state as a whole to serve to tackedly fixing the film-like liquid crystal apparatus 50. That is, in arranging the film-like liquid crystal apparatus 50 to the recessed portion 71 of the lower side holding member 70, the film-like liquid crystal apparatus 50 can easily be positioned and tackedly fixed since the complimentary pointed edge portion 52 of the film-like liquid crystal apparatus 50 can be inserted into the comparatively pointed edge portion 82 and can tackedly be fixed by the eaves-like projected portion 81a. Further, the eaves-like projected portion 81a, 81b, and 81c are positioned to constitute a triangular shape as a whole and therefore, the eaves-like projected portions can specify one plane relative to the film-like liquid crystal apparatus 50 and therefore, the film-like liquid crystal apparatus 50 can easily be held preparatorily. Further, most of the three eaves-like projected portions 81a, 81b and 81c are disposed on one side of the curved face structure and therefore, even when the film-like liquid crystal apparatus 50 is comparatively rigid, in pressing by the eaves-like projected portions 81a, 81b and 81c, there is hardly a concern of applying excessive local stresses to the film-liquid crystal apparatus 50.

Further, the lower side holding member 70 is provided with recessed portions 87a, 87b, 87c, 87d, . . . (designated by notation 87 when generally designated or when the recessed portions are not differentiated from each other) to be engaged with the locking edge portions 32a, 32b, 32c, 32d, . . . of the module fixing plate 30 at a peripheral edge portion 86 and includes locked projected portions 85a, 85b, 85c, 85d, . . . (designated by notation 85 when generally designated or when the locked projected portions are not differentiated from each other) to be locked by the locking hole portions 33a, 33b, 33c, 33d, . . . of the locking edge portions 32a, 32b, 32c, 32d, . . . at insides of the respective recessed portions 87a, 87b, 87c, 87d, . . .

The upper side holding member 90 is provided with a curved face shape having an outer shape substantially in an elliptical shape and curved similar to the glass plate 2 and the lower face 17 of the bottom wall 11 of the case 10. That is, the upper side holding member 90 is provided with a shape in which a long diameter R31 and a short diameter R32 of the ellipse are directed in directions skewed to X axis and which is extended along a curved face curved by a constant radius of curvature in view from a face orthogonal to X axis. More in details, the upper side holding member 90 comprises sheet metal in, for example, a shape of a warped ring and having a constant thickness and includes the edge portion 92 in a ring-like shape formed by punching and bending sheet metal and extended along a peripheral edge portion of the holding member 90. The warped ring-like upper side holding member 90 is provided with a plurality of hole portions 91a, 91b, . . . (designated by notation 91 when generally designated or when the hole portions are not differentiated from each other) of a complimentary sectional shape to be fitted with the plurality of projected portions 77a, 77b, . . . of the edge portion of the ring-like lower side holding member 70 and opening portions 93a, 93b, 93c (designated by notation 93 when generally designated or when the opening portions are not differentiated from each other) for receiving the eaves-like projected portions 81a, 81b, 81c of the lower side holding member 70 at the peripheral edge portion 92.

Therefore, in a state in which the film-like liquid crystal apparatus 50 is tackedly fixed by the eaves-like projected portions 81a, 81b and 81c and arranged at the recessed portion 71 of the lower side holding member 70, the upper side holding member 90 can be engaged and fixed to the lower side holding member 70 by mounting the upper side holding member 90 on the thick-walled peripheral edge portion 72 of the lower side holding member 70 such that the projected portions 77 and 81 of the lower side holding member 70 are fitted to the corresponding ones of the hole portions 91 and 93 and calking the projected portions 77 projected from the hole portions 91 by thermal calking or the like.

When the upper side holding member 90 is mounted on the peripheral edge portion 92 of the lower side holding member 70 and the upper side holding member 90 is fixed to the lower side holding member 70 such that the lower face of the upper side holding member 90 is brought into close contact with the upper face of the peripheral edge portion 92 of the lower side holding member 70 in this way, the peripheral edge portion of the upper face of the film-like liquid crystal apparatus 50 tackedly fixed by the eaves-like projected portions 81a, 81b and 81c are pressed by the lower face of the upper side holding member 90 over an entire region thereof to actually leave from the eaves-like projected portions 81. As a result, it can firmly be avoided that locally large stresses remain at portions of the upper face of the film-like liquid crystal apparatus 50 by small regions of the eaves-like projected portion 81.

The film-like liquid crystal apparatus 50 comprises an integral laminated body including a liquid crystal layer, transparent electrode carrying film layers such as polycarbonate films disposed on both sides (upper and lower sides) of the liquid crystal layer and having electrodes and polarizer layers arranged on both sides of the film layers and can be curved under operation of external force. Here, each of the polarized layers comprises a polarized light filtering layer such as an elongated film of PVA (polyvinyl alcohol) and protective layers for interposing the polarized light filtering layer from both sides thereof to protect. When the polarized light filtering layer comprises an elongated film having a thickness of about 25 μm, the protective layer comprises a film which is comparatively hard and thicker than the polarized light filtering layer (for example, about 80 μm) such as a TAC (triacetylcellulose) film. As a result, the film-like liquid crystal apparatus 50 is provided with comparatively high bending rigidity and when the film-like liquid crystal apparatus 50 is deformed along a curved face specified by the upper and the lower holding members 70 and 90, a property thereof of returning to an original planar shape is difficult to disregard.

Therefore, in mounting the film-like liquid crystal apparatus 50, the film-like liquid crystal apparatus 50 comprising a multi-layer structure is arranged at inside of the receiving recessed portion 71 having a depth coinciding with the thickness of the liquid crystal apparatus 50. At this occasion, the lower face of the peripheral edge portion of the film-like liquid crystal apparatus 50 is brought into contact with the receiving recessed portion 71 and the upper face of the peripheral portion is inserted under the eaves portions 81*a*, 81*b* and 81*c*. Under the state, the upper side holding member 90 is mounted to predetermined positions on the peripheral edge projected portions 77 and 81 of the lower side holding member 70. Thereby, the projected portions 77*a*, 77*b*, . . . of the lower side holding member 70 are projected from the holes of the upper side holding member 90 and the eaves portion 81*a*, 81*b* and 81*c* of the lower side holding member 70 are received by the opening portions 93*a*, 93*b* and 93*c* of the upper side holding member 90. As a result, the peripheral edge portion of the region of the film-like liquid crystal apparatus 50 which is not locked by the eaves portion 81*a*, 81*b* and 81*c* is pressed by the curved lower face 95 of the ring-like portion 94 of the upper side holding member 90 to deform in a shape substantially along a curved face of the lower side holding member 70 to a position to a predetermined position.

Finally, the projected portions 71*a*, 71*b*, . . . of the lower side holding member 70 penetrated to project from the holes 91 of the upper side holding member 90 are calked by thermal calking or the like to thereby fix the upper side holding member 90 in a state in which the lower face of the upper side holding member 90 is brought into close contact with the upper face of the lower side holding member 70. By this construction, the holding mechanism 60 and the film-like liquid crystal apparatus 50 form a unitary structure in which the film-like liquid crystal apparatus 50 is integrally and firmly held in a curved state. Thereby, the film-like liquid crystal apparatus 50 is held in a predetermined curved state and in a predetermined direction by the holding mechanism 60 comprising the upper side and the lower side holding members 70 and 90 in a state of minimizing a concern of nonuniformly exerting excessive press force.

Further, when a backlight is provided to the film-like liquid crystal apparatus 50, as a backlight, an organic EL apparatus of a shape substantially similar to that of the film-like liquid crystal apparatus 50 (at least spreading over a total of the display region of the film-like liquid crystal apparatus 50) is arranged to be brought into close contact with the lower face of the film-like liquid crystal apparatus 50. In that case, the organic EL layer constituting a light source of the film-like liquid crystal apparatus 50 is integrated along with the film-like liquid crystal apparatus 50 to be held in the receiving recessed portion by the holding mechanism 60 along with the film-like liquid crystal apparatus 50. Therefore, the above-described explanation of integrating the film-like liquid crystal apparatus 50 is applicable to the film-like liquid crystal apparatus 50 having the backlight as it is. In that case, for example, a control of conducting electricity to the EL apparatus is carried out via a terminal comprising a helical spring (not illustrated) penetrating a cylindrical portion designated by notation 55 in FIG. 1.

The film-like liquid crystal apparatus 50 integrated by the holding mechanism 60 in this way is successively integrated along with the holding mechanism 60. That is, the holding mechanism 60 is locked by and fixed to the module fixing plate 30 previously fixed to the case 10 above the receiving base 20 of the case 10 by being integrated to the case 10 such that the peripheral face of the lower side holding member 70 is fitted to the peripheral face of the receiving recessed portion 11 having the complimentary shape and the bottom face 74 and the irregularity portion 75 of the lower side holding member 70 is fitted to the irregularity portion 21 having the complimentary shape of the receiving base 20 at the corner portion of the receiving recessed portion 11 of the case 10 and such that the lower side holding member 70 receives the engaging edge portion of the module fixing plate 30 at the groove portion 87 of the outer peripheral face and the engaged projected portion 85 in the hook-like shape of the groove portion 87 is engaged with the engaging hole portion 33 of the engaging edge portions 32 of the module fixing plate 30.

Figure 4:
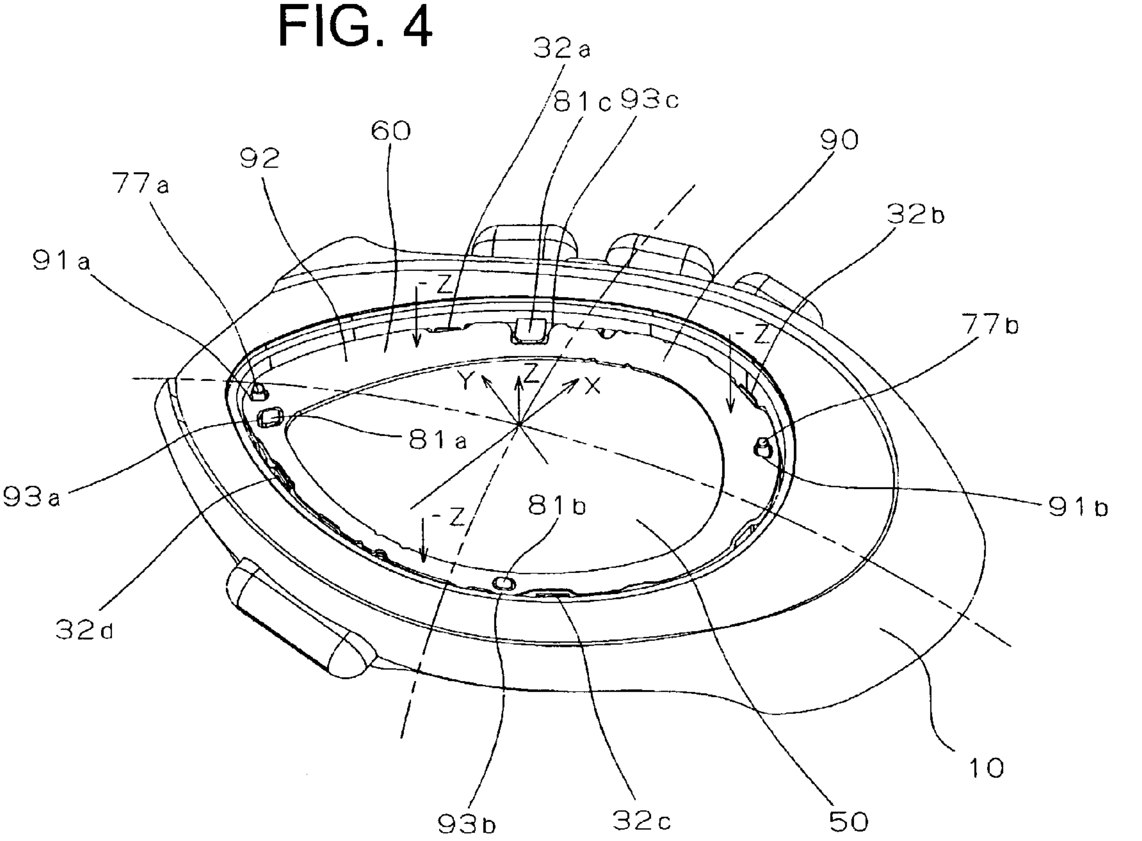
FIG. 4 is a perspective explanatory view of a state of attaching the module fixing plate, the circuit block structure and a liquid crystal apparatus holding mechanism to the containing recessed portion of the case in the electronic apparatus of FIG. 1.
Figure 5:
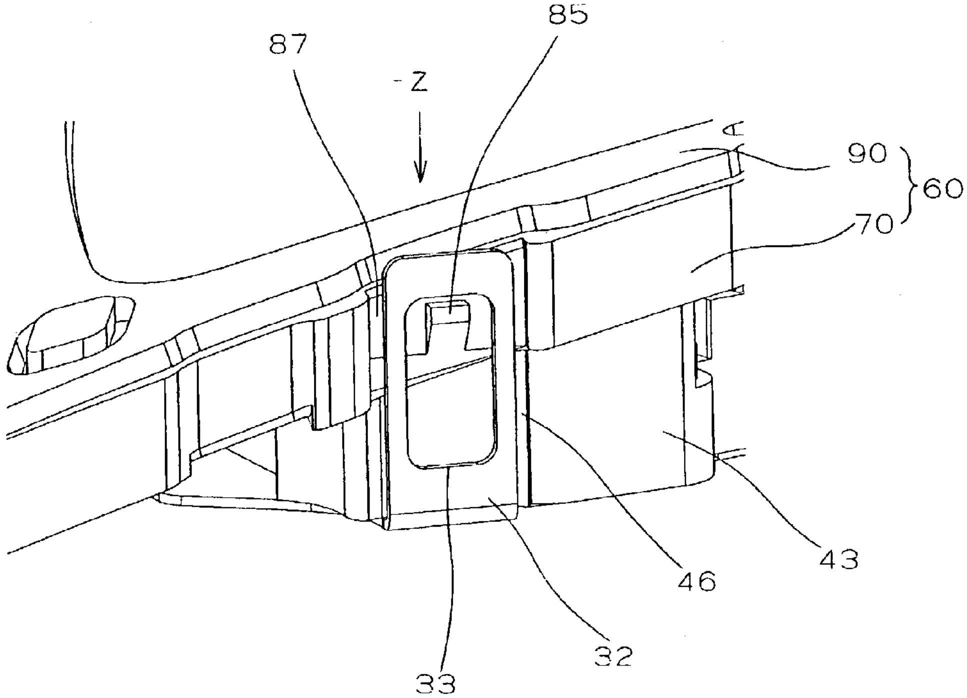
FIG. 5 is a perspective explanatory view of a locking structure of the liquid crystal apparatus holding mechanism by the module fixing plate of the electronic apparatus of FIG. 1.

A state in which the holding mechanism 60 integrally assembled with the film-like liquid crystal apparatus 50 is arranged at inside of the containing recessed portion 11 and locked by the module fixing plate 30 to position and fix is the state shown by FIG. 4. Further, FIG. 5 shows an enlarged state in which the engaged projected portion 85 of the groove portion 87 of the holding mechanism 60 is locked by the locking or engaging edge portion 32 of the module fixing plate 30.

Here, the engaging edge portion 32 of the module fixing plate 30 comprises a portion constituted by folding to bend sheet metal and therefore, by pushing the holding mechanism 60 downwardly in −Z direction, the engaging edge portion 32 of the module fixing plate 30 is curved outwardly, the engaged projected portion 85 is engaged with the engaging hole 33 of the engaging edge portion 32 of the module fixing plate 30 to elastically recover the engaging edge portion 32 and therefore, the module fixing plate 30 and the holding mechanism 60 can easily and firmly be engaged. Further, in positioning and fixing the film-like liquid crystal apparatus 50 via the holding mechanism 60, external force is not directly exerted to the film-like liquid crystal apparatus 50 and therefore, there is not a concern of warping the film-like liquid crystal apparatus 50. However, so far as the holding mechanism 60 can be locked, positioned and fixed in the containing recessed portion 11 of the case 10, the way of locking can utilize any other structure.

Further, in FIG. 1, notation 65 designates a flexible cable having a thermally press-contacting performance for electrically connecting the film-like liquid crystal apparatus 50 and the circuit block 42. For example, the flexible cable 65 shown in FIG. 1 may previously be connected to an electrode terminal of the film-like liquid crystal apparatus 50 at one end thereof and may previously be connected to a connection terminal of the circuit board 41 of the circuit block 42 at other end thereof. In that case, when the film-like liquid crystal apparatus 50 is integrated to the holding mechanism 60, the circuit block 41 may previously be extended to the lower side of the lower side holding member 70 via the large bottom portion opening 79*a* of the lower side holding member 70.

When integration of the holding mechanism 60 has been finished in this way, finally, the integration is finished by covering the lid 3 provided with the glass plate 2 on the opening portion of the containing recessed portion 11. A state of finishing the integration corresponding to a state is shown by FIG. 6A.

Although in the above-described, an explanation has been given of an example in which the case 10 is provided with the containing recessed portion 11 having the bottom wall and considerably opened to direct to the surface side and the integration and assembling is carried out from the front face side (+Z direction), so far as the case 10 is provided with a supporting or locking structure capable of supporting the holding mechanism 60, the case 10 may be opened to the bottom portion and the integration may be carried out from the bottom portion side. In that case, for example, the upper side holding member 90 may be provided with irregularities or the like at the upper face or the outer peripheral edge and the irregularities of the upper face or the outer peripheral edge may be engaged with irregularities of the inner peripheral face of the receiving recessed portion 11 of the case 10 to be positioned and fixed. Further, a supporting or locking function of the holding mechanism 60 may be provided to the case 10 by an auxiliary member integrated and attached to the case 10 from, for example, the bottom portion side instead of providing the function at the case 10 by itself. Further, depending on cases, regardless of integrating the holding mechanism 60 from the front face side or integrating the holding mechanism 60 from the back face side, without actually forming irregularities of the holding mechanism 60, the holding mechanism 60 may be positioned by and fixed to the case by utilizing a noncircular peripheral face shape of the holding mechanism 60.

What is claimed is:

1. A portable electronic apparatus comprising:

a thin film-type display member having a pair of projections;

a display member holding mechanism comprising a lower side holding member having a first recessed portion receiving the thin film-type display member and a pair of second recessed portions receiving the respective projections of the thin film-type display member, and an upper side holding member engaged with the lower side holding member at a peripheral edge portion of the first recessed portion of the lower side holding member to hold the thin film-type display member in the first recessed portion of the lower side holding member in a curved state; and a case having a recessed portion and locking means for locking the display member holding mechanism in the recessed portion of the case to hold the thin film-type display member in the curved state.

2. A portable electronic apparatus according to claim 1; wherein the thin film-type display member has a curved peripheral edge portion.

3. A portable electronic apparatus according to claim 1; wherein the locking means comprises a plate member having a generally planar-shaped main body portion mounted on a bottom wall of the recessed portion of the case and a plurality of locking projected edge portions extending from a peripheral edge of the main body portion and projecting towards an opening portion of the recessed portion of the case, the locking projecting edge portions being disposed in engagement with the peripheral edge portion of the lower side holding member of the display member holding mechanism to thereby lock the display member holding mechanism in the recessed portion of the case while the thin film-type display member is in the curved state.

4. A portable electronic apparatus according to claim 3; wherein the plate member is made of metal; and further comprising a circuit block and a shielding terminal portion extending from the main body portion of the plate member and disposed in elastic contact with the circuit block.

5. A portable electronic apparatus according to claim 1; wherein the thin film-type display member comprises a thin film-type liquid crystal display apparatus.

6. A portable electronic apparatus according to claim 5; wherein the thin film-type display member has an EL layer laminated on a rear surface of the thin film-type liquid crystal display apparatus.

7. A portable electronic apparatus according to claim 1; wherein the lower side holding member has a plurality of projections extending from the peripheral edge portion of the first recessed portion of the lower side holding member; and wherein the upper side holding member has a plurality of holes receiving the respective projections.

8. A portable electronic apparatus according to claim 1; wherein the upper side holding member covers an entire peripheral edge portion of the thin film-type display member.

9. A portable electronic apparatus according to claim 1; wherein the thin film-type display member has an outer peripheral surface having a preselected contour; and wherein each of the upper side holding member and the lower side holding member of the display member holding mechanism has an outer peripheral surface conforming generally to the preselected contour of the outer peripheral surface of the thin film-type display member.

10. A portable electronic apparatus according to claim 1; wherein the thin film-type display member has an outer peripheral surface having a preselected contour; and wherein the first recessed portion of the lower side holding member has an inner peripheral surface surrounding completely the outer peripheral surface of the thin film-type display member.

11. A portable electronic apparatus according to claim 10; wherein the outer peripheral surface of the thin film-type display member has a preselected contour; and wherein the inner peripheral surface of the first recessed portion of the lower side holding member conforms generally to the preselected contour of the outer peripheral surface of the thin film-type display member.

12. A portable electronic apparatus comprising: a display member having a display surface and a pair of projections; a case having a recessed portion; and a mounting mechanism for mounting the display member in the recessed portion of the case, the mounting mechanism having a first mounting member for supporting the display member and a second mounting member for integral connection to the first mounting member to hold the display member therebetween in a curved state while the second mounting member is disposed over an entire outer periphery of the display surface of the display member, the second mounting member having a pair of recessed portions for receiving the respective projections of the display member.

13. A portable electronic apparatus according to claim 12; further comprising connecting means for integrally connecting the mounting mechanism to the case.

14. A portable electronic apparatus according to claim 13; wherein the case has a main body having a base portion and a peripheral wall extending from the base portion to define the recessed portion of the case; and wherein the connecting means comprises a plate member integrally connected to the base portion of the case.

15. A portable electronic apparatus according to claim 14; wherein the plate member comprises a main body portion and a plurality of locking portions extending from a peripheral edge of the main body portion for locking engagement with the first mounting member of the mounting mechanism.

16. A portable electronic apparatus according to claim 15; wherein the plate member is made of metal; and further comprising a circuit block and a shielding terminal portion extending from the main body portion of the plate member and disposed in elastic contact with the circuit block.

17. A portable electronic apparatus according to claim 12; wherein the display member comprises a thin film-type display member.

18. A portable electronic apparatus comprising: a case having a recessed portion; a unitary structure comprised of a pair of mounting members integrally supporting a thin film-type display member in a curved state, one of the mounting members having a pair of recessed portions receiving respective projections extending from the thin film-type display member; and connecting means for integrally connecting the unitary structure in the recessed portion of the case so that the thin film-type display member is mounted to the case in the curved state.

19. A portable electronic apparatus according to claim 18; wherein the thin film-type display member has a display surface; and wherein one of the mounting members of the unitary structure is disposed over an entire periphery of the display surface of the thin film-type display member.

20. A portable electronic apparatus according to claim 18; wherein one of the mounting members is formed of a single piece of material and has a plurality of projections projecting from surface portions thereof; and wherein the other of the mounting members has a plurality of holes for receiving the respective projections to integrally support the thin film-type display member in the curved state.

* * * * *